United States Patent [19]

Carter

[11] Patent Number: 5,176,355
[45] Date of Patent: Jan. 5, 1993

[54] CONTROL FOR HEIGHT OF A SEAT

[76] Inventor: John W. Carter, 3430 54th St., Moline, Ill. 61265

[21] Appl. No.: 804,249

[22] Filed: Dec. 9, 1991

[51] Int. Cl.$^5$ ............................................ F16M 13/00
[52] U.S. Cl. ................................. 248/550; 248/564; 248/588; 248/631; 296/65.1; 297/347
[58] Field of Search ............... 248/550, 157, 631, 564, 248/562, 588; 297/345, 347; 296/65.1; 267/64.28

[56] References Cited

U.S. PATENT DOCUMENTS

| | | | |
|---|---|---|---|
| 3,999,800 | 12/1976 | Penzotti | 248/585 X |
| 4,213,594 | 7/1980 | Pietsch et al. | 248/550 |
| 4,461,444 | 7/1984 | Grassl et al. | 248/550 |
| 4,733,847 | 3/1988 | Grassl | 248/550 |
| 4,941,641 | 7/1990 | Granzow et al. | 296/65.1 X |
| 4,946,145 | 8/1990 | Kurabe | 248/564 X |
| 5,058,852 | 10/1991 | Meier et al. | 248/631 X |

*Primary Examiner*—Ramon O. Ramirez
*Attorney, Agent, or Firm*—Glenn H. Antrim

[57] ABSTRACT

The housing of an air valve, the valve controlling the height of a vehicle seat supported on a suspension having an air spring, is pivotally connected to one of the frames of the suspension supporting the seat. A manual control lever connected to the housing is operative to change the angle of inclination of the housing for selecting a desired height of the seat. A control arm of the valve is connected by a linkage to the other frame of the suspension. These connections to the air valve control the valve for selecting a desired height and for automatically restoring the height for different weights on the seat.

5 Claims, 2 Drawing Sheets

CONTROL FOR HEIGHT OF A SEAT

BACKGROUND OF THE INVENTION

This invention pertains to mechanisms for controlling height of upper frames in seat suspensions such as those commonly used in vehicles, and more particularly in seat suspensions having air springs.

The heights of vehicle seats having air springs are adjusted to desirable levels by drivers operating adjusting levers attached to respective upper frames of the seat suspensions. Unless air is automatically added to or bled from an air spring of a seat of this type, the occupancy of the seat by a driver of different weight will change the height from the selected desired height according to the degree of compression of air in the air spring.

According to U.S. Pat. No. 3,999,800 issued to Roger Paul Penzotti on Dec. 28, 1976, an adjusting lever for controlling addition and bleeding of air from an air spring is pivotally attached to an upper frame of a seat suspension to provide both manual selection of a desired height and automatic restoration to the desired height. The adjusting lever is manually set at different predetermined angles corresponding to different desired heights, and while at the set angle and as the weight on the seat is changed, the entire lever is moved vertically with the upper frame to restore the height of the seat. In this prior arrangement, quite long levers are shown to operate a plunger of an air valve.

The height of another vehicle seat that has been available on the market is controlled by a readily available air valve having a control arm about 7 inches (178 mm) long extending horizontally and rearwardly between upper and lower frames of a seat suspension. The housing of the air valve is secured to the lower frame, and the distal end of the control arm is connected by a vertical link to a control lever connected to the upper frame. As described in the Penzotti patent, the control lever can be turned to different positions about a pivot connected to the upper frame for selection of desired heights, and a change in distance between the upper frame and the lower frame controls the air valve to add air to or to bleed air from the air spring for restoring the selected desired height.

SUMMARY OF THE INVENTION

According to the present invention, a manual control for adjustment of height is connected to the housing of an air valve rather than to its control arm. Manual operation of the control turns the housing over a limited arc about a horizontal pivot. This control prevents interference of the control arm with a frame of a compact suspension.

In excavating machinery, little space may be available for a seat, and therefore the seat must be more compact than usual. By using the new manual control, available air valves like those used to control the air pressure in air springs of semitrailers, are applicable to compact suspensions. In a seat suspension according to the prior arrangements, the control arm that is to be turned about a horizontal axis must have a minimum length of about 4 inches (102 mm). In each of the available seats described above, the length between the horizontal axis of the control arm and the point from which a linkage is connected to a lower frame of a seat is even longer, about twice the minimum length.

If a control arm is shorter than the required minimum length, a slight change in distance between the frames of a suspension causes the air valve to be operated repeatedly while the seat oscillates between a position for adding and a position for bleeding air from the air spring. The oscillation of the seat results from the control arm being turned too far by small displacements of the upper frame from a desired selected height. A control arm that is even as short as the minimum length required in the prior arrangements is impractical in a seat of the required compactness because the arm would hit the upper frame when the manual control lever is moved to a setting for a maximum height while the seat is in a low position.

In a preferred embodiment of the invention, manual control means comprises pivotal means for connecting the housing of an air valve to the upper frame of a seat suspension, and in addition a control lever is connected between the upper frame and the housing. The control lever is operative to different positions for determining respectively different tilts of the housing about a pivot of the pivotal means. When the control lever is in an intermediate position for selection of a particular intermediate height of the upper frame relative to the lower frame, the housing of the air valve is vertical. A linkage connected between the distal end of the control arm of the air valve and the lower frame completes mechanical connections to the air valve for manually selecting height and also for automatically restoring height to the selected height.

Since the pivot of the control arm is at a fixed distance from the upper frame and the distal end of the control arm is held practically at a fixed distance from the lower frame, different distances between the frames determine corresponding particular inclinations of the control arm. When the housing of the air valve is vertical for a particular intermediate setting of the manual control lever and the height of the upper frame is in its corresponding intermediate position relative to the lower frame, the control arm of the valve is positioned horizontally and therefore perpendicularly to the housing of the valve. Passageways of the air valve are closed while the control arm is in the perpendicular position.

Operation of the manual control tilts the housing of the air valve about its pivot that is on the same axis as the pivot for its control arm. Tilting the housing in a direction for lowering the upper frame operates the air valve to open a passageway from the air spring to atmosphere, and tilting the housing in the opposite direction operates the air valve to open a passageway between the air spring and a source of compressed air. When the seat reaches its selected height, the control arm is perpendicular to the housing for closing both of the passageways. To prevent useless spurts of air through the valve, a preferred staple valve has delayed operation to prevent opening of either passageway until more than a second has elapsed after motion of a vehicle turns a control arm from its perpendicular position.

A feature of the invention is the inclusion of a motor-compressor and a pressure controlled switch within the suspension so that the adjustment of height of the suspension is independent of the source of compressed air for the vehicle in which the suspension is installed. Particularly, the pressure controlled switch is located in the air line between the outlet of the compressor and the inlet of the air valve such that an air tank is unnecessary.

DESCRIPTION OF THE PREFERRED EMBODIMENT

Figure 1:
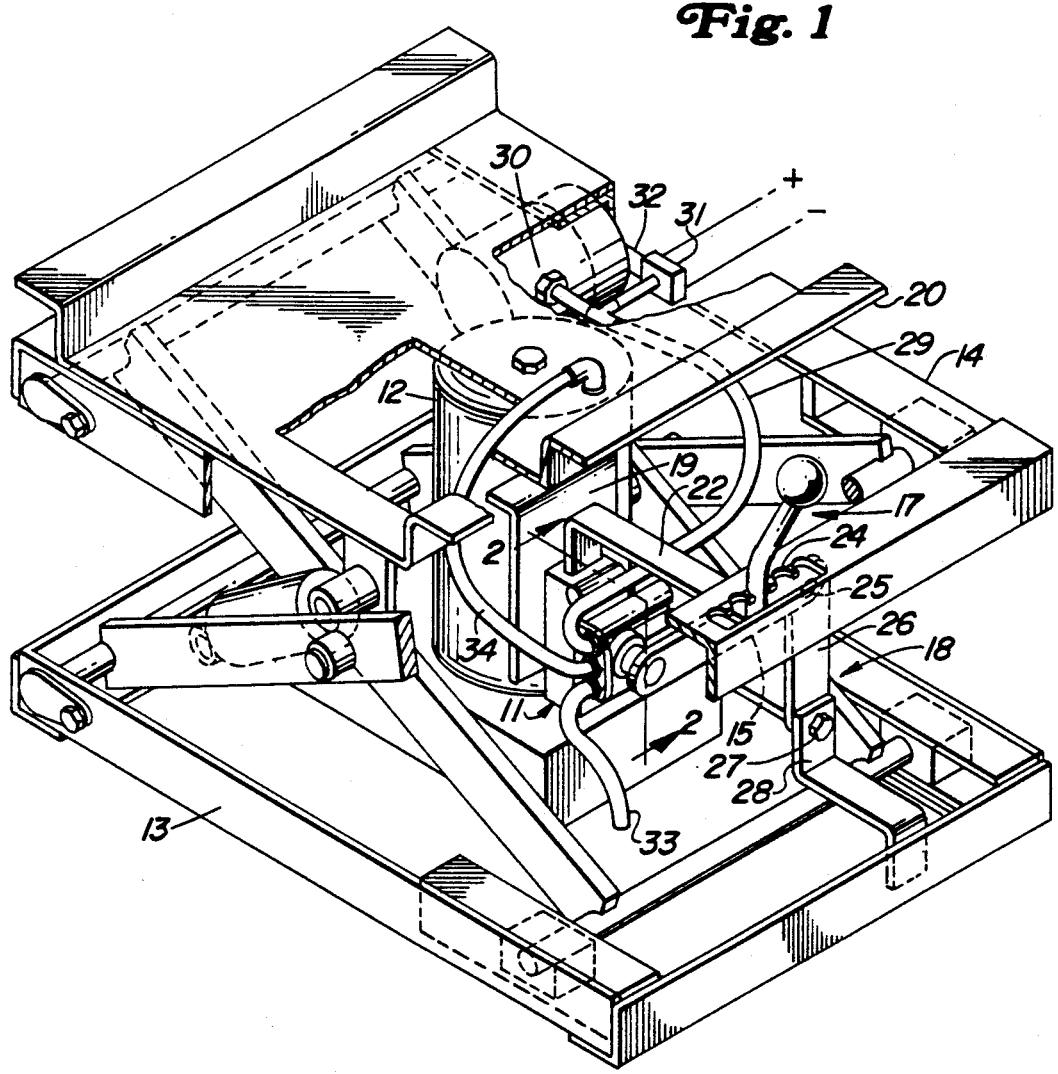
FIG. 1 is a perspective view of an air valve and controls according to this invention connected to a fragmentary view of a seat suspension.

In FIG. 1, a staple air valve 11 is shown connected pneumatically to an air spring 12. The bottom of the air spring 12 is secured to the lower frame 13 of a vehicle seat suspension, and the air spring supports resiliently the upper frame 14. In order to eliminate contact of a control arm 15 of the air valve 11 with the frame of a compact seat suspension, the housing 16 of the air valve is pivotally connected to the upper frame 14. The housing is turned to indexical angles by a manual control lever 17 for selecting desired heights of the upper frame 14. The distal end of the control arm 15 is connected by a linkage 18 to the lower frame 13.

Figure 2:
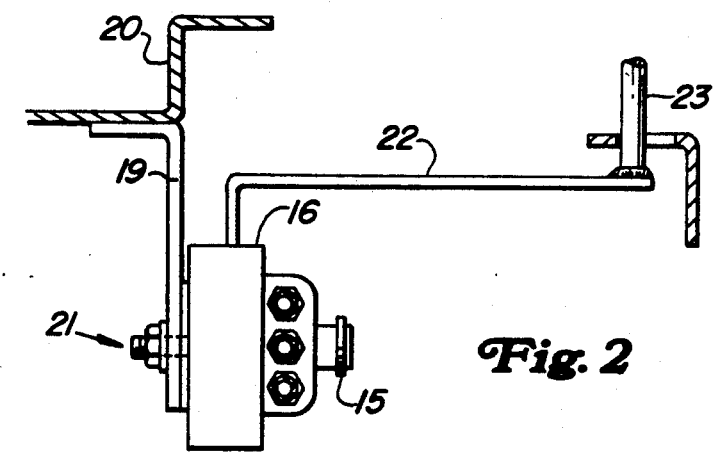
FIG. 2 is a cross-sectional view on the line 2—2 of FIG. 1 of the pivotal connection of the air valve to the upper frame of the seat suspension.

The air valve 11 located between the frames 13 and 14, is connected to the upper frame 14 by a bracket 19. The upper end of the bracket 19 (FIGS. 1 and 2) is secured to a pan 20 on the upper frame 14, and pivotal means includes a horizontal stud bolt 21 pivotally connecting the housing 16 to the lower part of the bracket. The stud bolt 21 is turned into that side of the housing 16 opposite the control arm 15 and must be substantially aligned with the axis about which the control arm rotates. The bolt 21 is a sliding fit within a hole through the lower part of the bracket 19 and retains the housing 16 to bear against a large polethylene washer that is between the housing and that side of the bracket facing the occupant's left side of the seat suspension. A spring washer and a nut on the bolt provide suitable tension for permitting rotation of the valve 11 to a selected inclination.

A flat bar 22 of the manual control lever 17 is connected to the upper end of the housing 16 of the air valve 11 and extends to the near end of the upper frame 14. The bar 22, that is quite thin, extends upwardly from the housing 16 and then extends substantially horizontally, the bar having a moderate degree of resiliency and the faces being horizontal to permit a sufficient flexibility for indexing. A round rod 23 welded to the upper surface at the outer end of the bar 22 extends upwardly in contact with indexical edge 24 in a slot of the upper frame 14, or in a plate attached to the upper frame, for indexing the positions of the bar 22 and therefore the inclinations of the valve 11 about the pivot or bolt 21.

That end of the control arm 15 (FIGS. 1 and 3) opposite the pivots connection to the air valve 11 is connected by a pivot 25 to the upper end of a substantially vertical member 26 of a linkage, and the lower end of the vertical member 26 is connected by a pivot 27 to a tab 28 extending upwardly from the lower frame 13. The vertical member maintains that end of the control arm 15 at substantially a fixed distance from the lower frame 13. The length of the bracket 19, for positioning the pivotal bolt 21 of the housing 16, and the length of the vertical member 26 are chosen to position the control arm 15 horizontally for a certain intermediate height of the upper frame 14. Setting the control lever 17 for a different angle controls the air valve 11 to change the height of the upper frame as described above.

Air lines (FIG. 1) are connected as usual to the air valve 11 but the source of compressed air may be independent of the usual source in the vehicle to which the suspension is attached. An input air line 29 is connected between the outlet of a compressor of a motor-compressor 30 to an inlet nipple of the air valve 11. The compact motor-compressor 30 may be located where space is available between the frames 13 and 14 in the suspension. A pressure controlled switch 31 has a pneumatic input connected to the air line 29 and an electrical switching circuit connected between a source of d-c voltage and the electrical input circuit 32 of the motor of the motor-compressor 30. A pressure tank is not required because the pressure controlled switch 31 starts the motor-compressor when pressure decreases in the air line 29.

Figure 3:
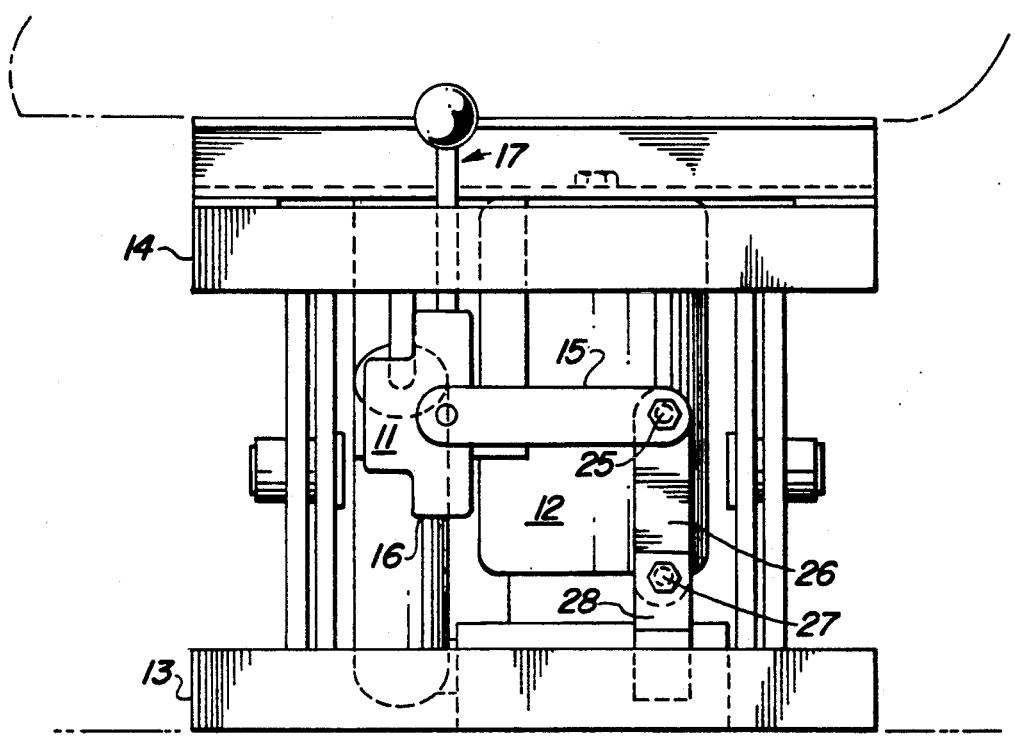
FIG. 3 is a left side view of the suspension showing a manual control connected between the housing of the air valve and the upper frame of the suspension and a linkage connected between a control arm of the air valve and the lower frame.
Figure 4:
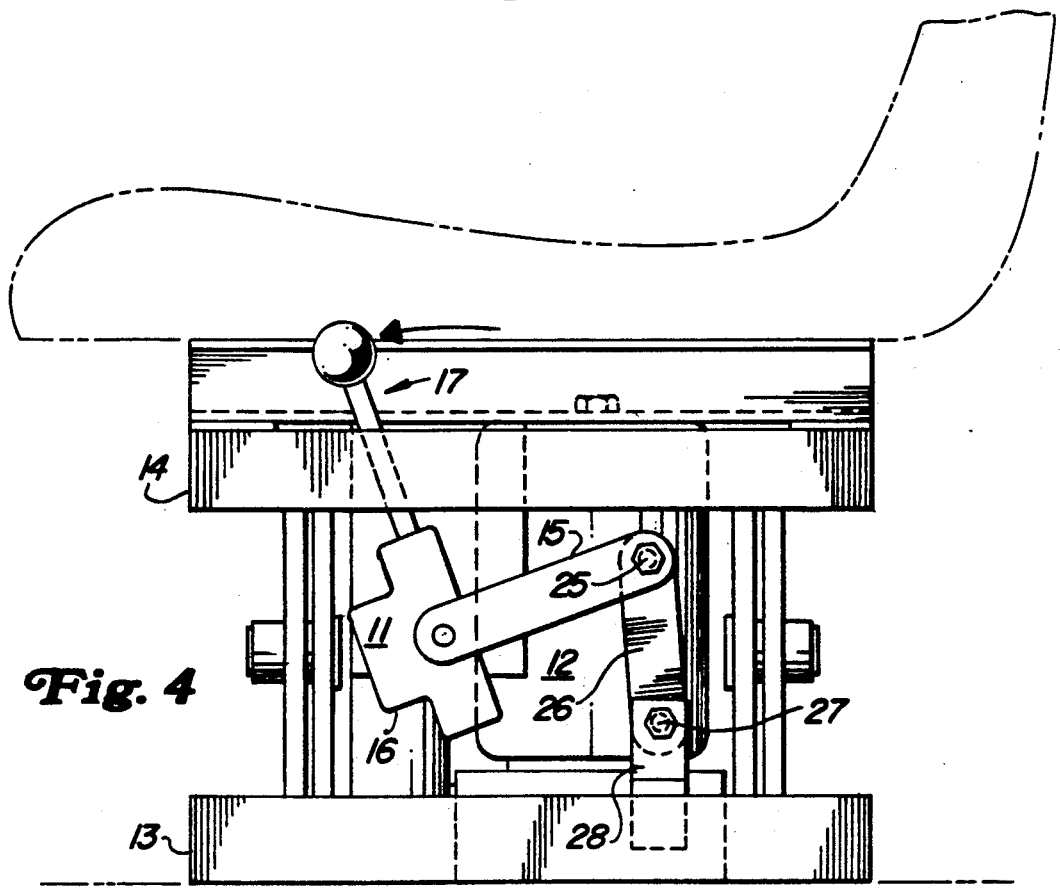
FIG. 4 is similar to that shown in FIG. 3 except the upper frame is at a lower level according to the setting of the manual control.

In FIG. 3, the control lever 17 is shown in an intermediate position in which the housing 16 is in a vertical position. The upper seat frame 14 is positioned at the selected height, and the control arm 15 is normally horizontal only at this height. The control arm 15 is therefore perpendicular to the vertical housing 16 for maintaining the valve 11 closed. In FIG. 4, the control lever 17 has been moved forward to the front scallop of the indexical edge 24 (FIG. 1) for adjusting the height of the upper frame 14 to its lowest position. Before the upper frame 14 has reached the selected height after the operation of the lever 17, the pivot at the valve 11 for the control arm 15 is too high for maintaining the perpendicular angle between the housing 16 and the control arm 15. Rotation of the housing 16 opened the passageway through the valve 11 (FIG. 1) to bleed air from the chamber of the air spring 12 through the air line 34, the passageway of the air valve, and through the air line 33 to atmosphere. At the desired height, the control arm 15 is again in the perpendicular position as shown to close the air valve 11.

When the control lever 17 been moved rearwardly from the position shown in FIG. 3, the housing 16 is turned in an opposite direction for opening the other passageway through the air valve 11. This open passageway permits flow of compressed air from the motor-compressor 30 (FIG. 1) through the air line 29, the air valve, and the air line 34 to the chamber of the air spring 12.

Fundamentally, controlling distances between two frames and cushioning is provided by an air spring, the spacing being controlled by an air valve having a connection to each frame. Operation of a manual control connected to one of the frames selects a desired distance between frames, and the closed and open conditions of the valve are determined by changes in distance between the frames, the changes in distance resulting from forces pressing the frames together. The connection of the manual control lever 17 and the pivot 21 for the housing 16 to the upper frame is preferred to provide easy access to the manual control lever. However, should attachment of connections to the air valve 11 at the lower frame 13 be preferred, the control rod 23 can be directed from the lower frame as required for convenient access, and the linkage 18 can be pivotally attached to the upper frame. In the embodiment that is shown, other known linkage connecting means can be used in place of the linkage 18 to connect between a vertical member connected to a frame and the control arm 15. For example, a pin extending horizontally from the upper end of the vertical member may slide in a longitudinal slot in the distal end of the control arm 15, or alternately a usual sliding block may be used in place of the pin and slot.

I claim:

1. A vehicle seat suspension having an upper frame, a lower frame, and an air spring between said frames to support said upper frame, an air valve for controlling air pressure within said air spring, said air valve having a housing, first pivotal means and a control arm connected to said housing, said first pivotal means permitting rotation of said control arm about a horizontal axis for controlling pressure within said air spring, the housing of said air valve being connected to one of said frames and means for connecting the other of said frames to said control arm at a point spaced from said first pivotal means; wherein the improvement comprises:

second pivotal means connecting said housing to said one frame, said second pivotal means permitting rotation of said housing about an axis substantially in alignment with said horizontal axis, linkage connecting means between said other frame said control arm at said point spaced from said first pivotal means, said linkage connecting means maintaining substantially constant spacing between said point of said control arm and said other frame to incline said control arm according to the distance between said first pivotal means and said other frame, manual control means connected to said housing to turn said housing about said second pivotal means for selecting particular angles of rotation of said housing relative to said frames for respective desired heights of said upper frame, and changes in height of said upper frame from a desired height changing the inclination of said control arm to control said air valve as required for restoring said selected desired height.

2. A vehicle seat suspension as claimed in claim 1 wherein said second pivotal means comprises a bracket connected to said one frame and extending toward said other frame, and a pivot having an axis substantially aligned horizontally for connecting said bracket and said housing of said air valve.

3. A vehicle seat as claimed in claim 2 wherein said manual control means comprises a control lever, a control member connecting said control lever to said housing of said air valve, and indexing means contacting said control lever for retaining said control member in a selected position, and said indexing means being connected to said one frame to which said housing of said air valve is pivotally attached.

4. A vehicle seat suspension as claimed in claim 1 wherein said linkage connecting means comprises a rigid tab secured to said other frame and extending toward said one frame, and a substantially vertical linkage member having one end pivotally connected to said tab and the other end thereof pivotally connected to said control arm at said point spaced from said first pivotal means.

5. A vehicle seat suspension as claimed in claim 1 having an electrically operated air compressor, an input air line connected to said air valve, said air compressor having an output connected to said input air line, a pressure controlled switch pneumatically connected to said input air line, and said pressure controlled switch being electrically connected to said air compressor to control operation thereof for maintaining required pressure in said input air line.

* * * * *